(12) United States Patent
Pedrinelli et al.

(10) Patent No.: US 12,459,308 B2
(45) Date of Patent: *Nov. 4, 2025

(54) PNEUMATIC TIRE EQUIPPED WITH A TRANSPONDER

(71) Applicant: BRIDGESTONE EUROPE NV/SA, Zaventem (BE)

(72) Inventors: Marco Pedrinelli, Rome (IT); Emiliano Sabetti, Rome (IT); Mauro Mirabile, Rome (IT); Emanuele Rosa, Rome (IT)

(73) Assignee: BRIDGESTONE EUROPE NV/SA, Zaventem (BE)

( * ) Notice: Subject to any disclaimer, the term of this patent is extended or adjusted under 35 U.S.C. 154(b) by 17 days.

This patent is subject to a terminal disclaimer.

(21) Appl. No.: 18/442,875

(22) Filed: Feb. 15, 2024

(65) Prior Publication Data

US 2024/0181818 A1 Jun. 6, 2024

Related U.S. Application Data

(63) Continuation of application No. 17/050,570, filed as application No. PCT/IB2019/053165 on Apr. 17, 2019, now Pat. No. 11,932,059.

(30) Foreign Application Priority Data

Apr. 27, 2018 (IT) .......................... 102018000004917

(51) Int. Cl.
*B60C 19/00* (2006.01)
*B29D 30/00* (2006.01)
(Continued)

(52) U.S. Cl.
CPC .......... *B60C 19/00* (2013.01); *B29D 30/0061* (2013.01); *B60C 15/0009* (2013.01);
(Continued)

(58) Field of Classification Search
CPC .......... B60C 2019/004; B60C 23/0493; B29D 30/0061; B29D 2030/0061;
(Continued)

(56) References Cited

U.S. PATENT DOCUMENTS 11,541,703 B2    1/2023  Pedrinelli et al.
11,932,059 B2 *  3/2024  Pedrinelli .......... B29D 30/0061
(Continued)

FOREIGN PATENT DOCUMENTS

EP    1552968 A1     7/2005
JP    2011525654 A   9/2011
(Continued)

*Primary Examiner* — Adrienne C. Johnstone
(74) *Attorney, Agent, or Firm* — Patterson Intellectual Property Law, PC

(57) ABSTRACT

A pneumatic tire includes: a body ply partially collapsed onto itself and therefore having two lateral flaps, in each of which an edge of the body ply rests against an intermediate portion of the body ply itself; two annular beads, each of which is surrounded by the body ply and comprises a bead core and a bead filler; an annular tread; a pair of sidewalls arranged axially externally to the body ply and extending radially inward from the tread; a pair of abrasion gum strips arranged at the beads axially externally to the body ply, and extending radially inward from the sidewalls; and a transponder axially arranged in an interior of one of the two flaps and located radially more to the inside of the edge of the body ply, wherein a radial distance greater than 7 mm is provided between the transponder and the edge of the body ply.

10 Claims, 10 Drawing Sheets

(51) Int. Cl.
*B60C 15/00* (2006.01)
*B60C 15/06* (2006.01)
*G06K 19/077* (2006.01)
*H01Q 1/22* (2006.01)

(52) U.S. Cl.
CPC ........ *B60C 15/06* (2013.01); *G06K 19/07764* (2013.01); *H01Q 1/2241* (2013.01); *B29D 2030/0077* (2013.01); *B60C 2015/0614* (2013.01); *B60C 2019/004* (2013.01)

(58) Field of Classification Search
CPC .... B29D 2030/0077; B29D 2030/0083; H01Q 1/2241; G06K 19/07764
See application file for complete search history.

(56) References Cited

U.S. PATENT DOCUMENTS

| | | |
|---|---|---|
| 2010/0122757 A1 | 5/2010 | Lionetti et al. |
| 2011/0175778 A1 | 7/2011 | Myatt |
| 2011/0284155 A1 | 11/2011 | Sevaille et al. |
| 2018/0174015 A1 | 6/2018 | Destraves |
| 2020/0108575 A1 | 4/2020 | Nagayoshi |
| 2020/0108670 A1 | 4/2020 | Nagayoshi |
| 2020/0108675 A1 | 4/2020 | Takagi |

FOREIGN PATENT DOCUMENTS

| | | | |
|---|---|---|---|
| KR | 1020130067944 A | 6/2013 | |
| WO | 2016193457 A1 | 12/2016 | |
| WO | 2019054227 A1 | 3/2019 | |
| WO | WO-2019207419 A1 * | 10/2019 | ......... B29D 30/0061 |
| WO | 2019220064 A2 | 11/2019 | |

\* cited by examiner

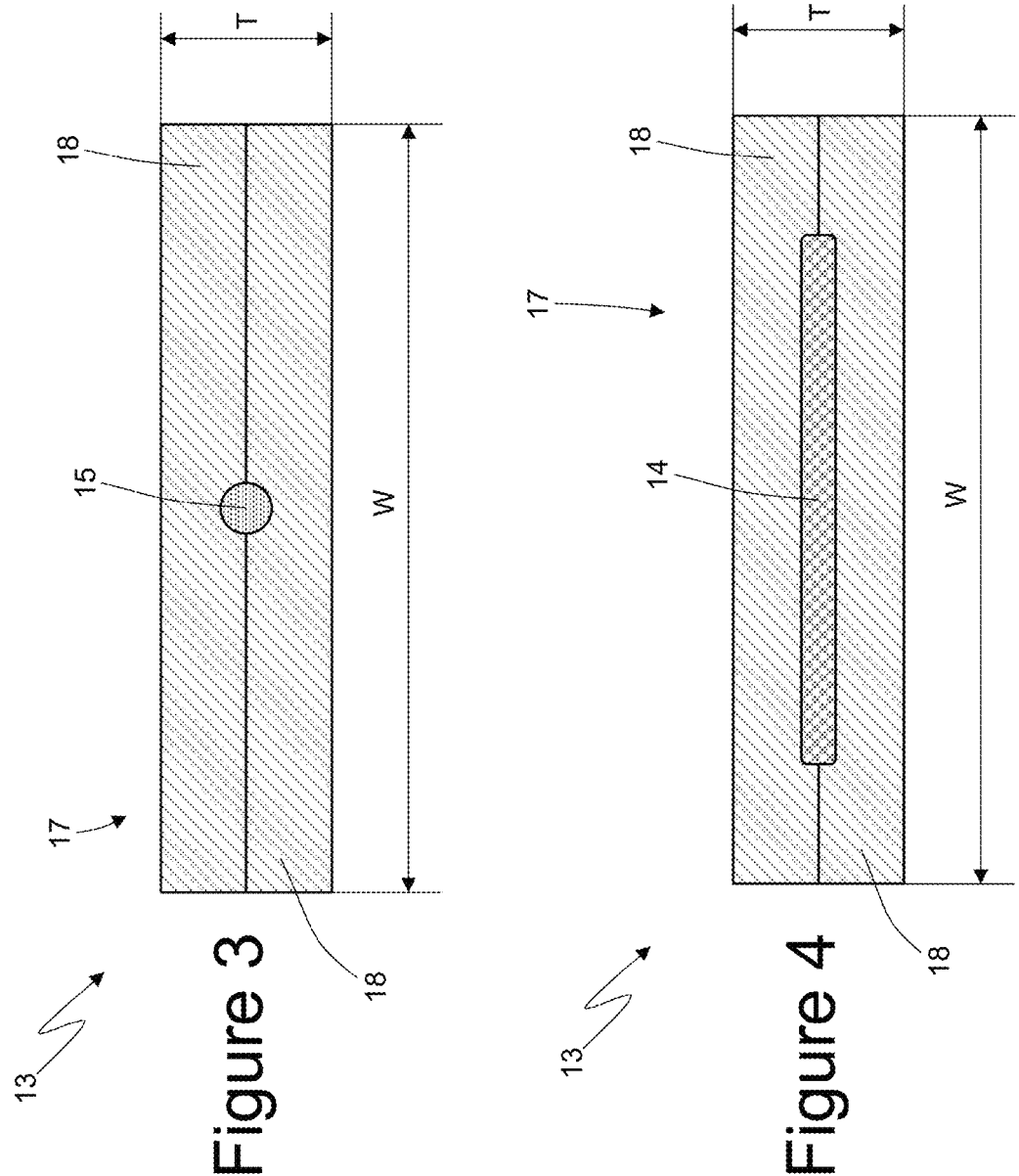

Fig. 11

Variant of Fig. 6 wherein the transponder 13 is bordered on the external side by and in contact externally with a corresponding portion of the sidewall 11 instead of the abrasion gum strip 12 (and thus in the zone where both the sidewall 11 and the abrasion gum strip 12 are present the abrasion gum strip 12 is arranged axially more to the outside of the sidewall 11).

PNEUMATIC TIRE EQUIPPED WITH A TRANSPONDER

FIELD OF THE INVENTION

The present disclosure relates to a pneumatic tire equipped with a transponder.

BACKGROUND

In recent years, so-called "smart" pneumatic tires have emerged, which are capable of forming an active part of modern vehicles, supplying information concerning the type of pneumatic tires mounted, information concerning the status of the pneumatic tires and also information concerning ambient conditions.

A "smart" pneumatic tire is normally equipped with a transponder (that is, an electronic device suitable for communicating in radio frequency) which permits remote communication (that is, to both the vehicle on which the tire is mounted and to an operator who must carry out the checking or the replacement of the pneumatic tire) of the identification, the characteristics, and the history of the pneumatic tire.

Recently, the unification has been proposed of RFID ("Radio-Frequency Identification") technology, based on the presence of transponders, with TPMS ("Tire Pressure Monitoring Systems") technology, which measures the effective inflation pressure in order to memorize in the transponders the effective inflation pressure and then remotely communicate the effective inflation pressure by means of the transponders themselves.

Initially, it was proposed to glue a transponder onto the internal surface or onto the external surface of a sidewall of a pneumatic tire; this solution is extremely simple from the design perspective and is applicable also to existing pneumatic tires; however, by contrast, it does not guarantee that the transponder will not detach from the pneumatic tire (especially when it is glued to the external surface) following the cyclical deformations to which the sidewall of a pneumatic tire is subjected.

Thereafter, the integration of a transponder within the structure of a pneumatic tire was proposed, that is, within the interior of the various layers that make up the pneumatic tire.

The patent application US20080289736A1describes a pneumatic tire wherein a transponder is integrated into the structure of the pneumatic tire at the bead; in particular the transponder is arranged between a sidewall and a bead filler above the flap of the body ply.

The patent application EP2186658A1 describes a pneumatic tire wherein a transponder is integrated into the structure of the pneumatic tire at the bead; in particular the transponder is arranged between a sidewall and a bead filler above the flap of the body ply, or the transponder is arranged between a bead filler and the body ply (that is, within the flap of the body ply).

The patent application EP1366931A2 describes a pneumatic tire wherein a transponder is integrated into the structure of the pneumatic tire at the bead; in particular the transponder is immersed within the bead filler and is located in the interior of the flap of the body ply or the transponder is immersed within the rubber arranged more to the inside of the bead core (therefore, it is located on the exterior of the flap of the body ply).

The patent application US2010122757A1 describes a pneumatic tire wherein a transponder is preferably arranged at a bead between an end of an abrasion gum strip and an end of the bead filler.

The patent application EP1552968A1 describes a pneumatic tire wherein a transponder is arranged at a bead radially more to the inside of an end of a body ply.

Nevertheless, the above-described positionings of the transponder within a pneumatic tire are not ideal, because they do not make it possible to minimize the stresses and deformations to which the transponder is subjected (both during the construction of the pneumatic tire and during the use of the pneumatic tire) and, at the same time, minimizing transponder radio frequency communications disturbances and interference.

BRIEF SUMMARY

An aim of the present disclosure is to provide a pneumatic tire equipped with a transponder that is free from the disadvantages described above and that is, in particular, easy and inexpensive to implement.

Numerous objects, features and advantages of the embodiments set forth herein will be readily apparent to those skilled in the art upon reading of the following disclosure when taken in conjunction with the accompanying drawings.

BRIEF DESCRIPTION OF THE SEVERAL VIEWS OF THE DRAWINGS

FIGS. 3 and 4 are two views in cross section of the transponder of FIG. 2 according to the section line III-III and according to the section line IV-IV.

FIG. 11 is a block diagram of a variant of FIG. 6 wherein the transponder 13 is bordered on the external side by and in contact externally with a corresponding portion of the sidewall 11 instead of the abrasion gum strip 12 (and thus in the zone where both the sidewall 11 and the abrasion gum strip 12 are present the abrasion gum strip 12 is arranged axially more to the outside of the sidewall 11).

DETAILED DESCRIPTION

Figure 1:
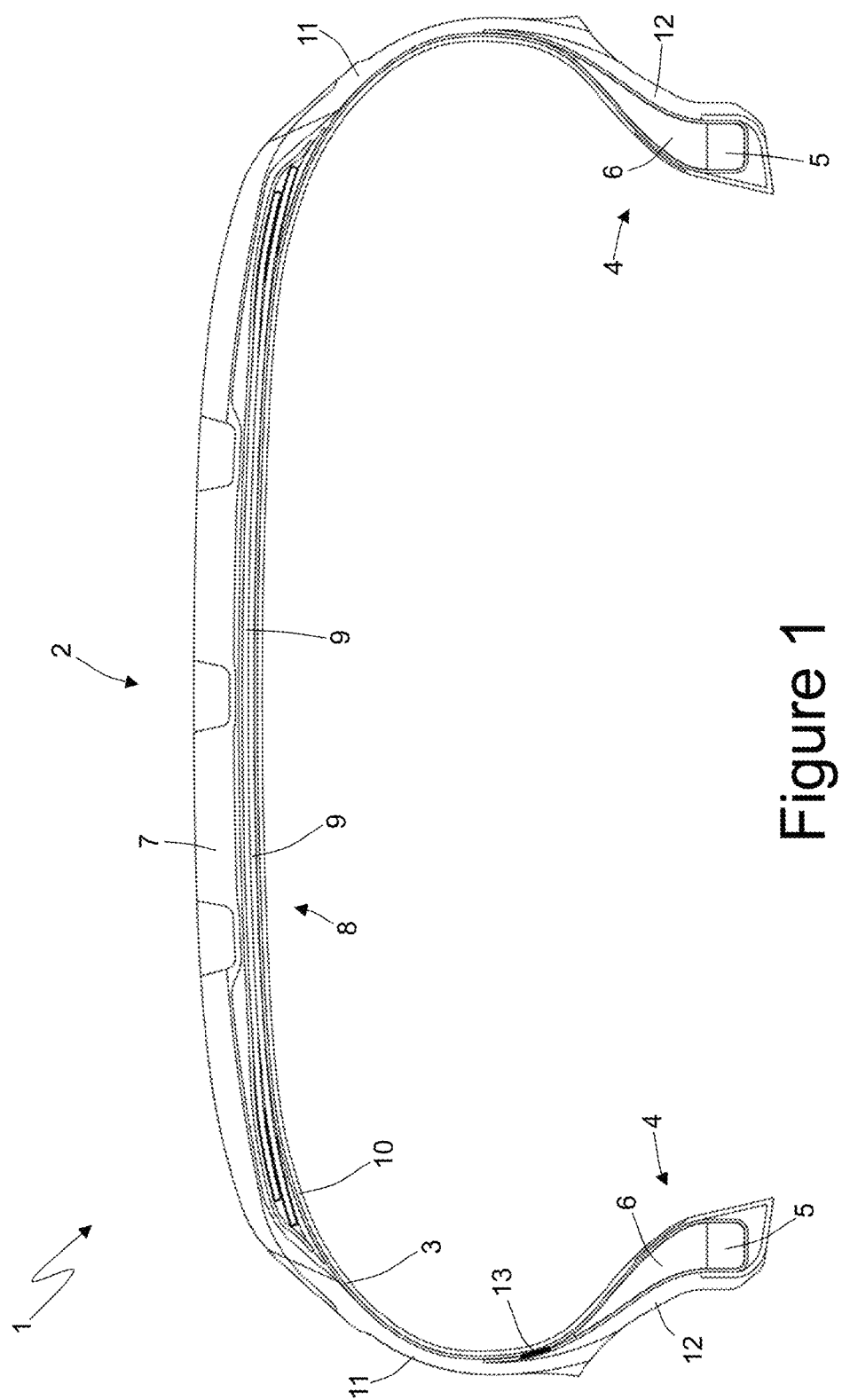
FIG. 1 is a schematic cross section, with parts removed for clarity, of a pneumatic tire manufactured in accordance with the present disclosure.

In FIG. 1 a pneumatic tire is indicated as a whole by the number 1 and comprises a toroidal carcass 2, which comprises a single body ply 3 partially collapsed upon itself and therefore having two lateral flaps (that is, two layers superimposed on one another and jointly referred to as "turn-up"). In each flap of the body ply 3, an edge (that is, a terminal end) of the body ply 3 is supported against an intermediate portion of the body ply itself. In other words, the toroidal carcass 2 comprises only and uniquely the single and unique body ply 3 and therefore does not comprise any other body ply (whether forming the flaps or not) superimposed on the body ply 3.

On the opposite sides of the carcass 2, two annular beads 4 are arranged, each of which is surrounded by the body ply 3 (that is, it is surrounded by the flaps of the body ply 3), and has a bead core 5 that is reinforced with a number of windings of a metallic wire and a bead filler 6.

The carcass 2 supports an annular tread 7; between the carcass 2 and the tread 7, a tread belt 8 is interposed, which comprises two tread plies 9. Each tread ply 9 comprises a number of cords (not shown), which are embedded within a rubber belt, are arranged alongside one another with a given pitch and form an angle of inclination determined in relation to an equatorial plane of the pneumatic tire 1.

An innerliner 10 is arranged within the body ply 3 which is airtight, constitutes an inner lining and has the function of retaining the air within the pneumatic tire 1 in order to maintain the inflation pressure of the same pneumatic tire 1 over time.

The body ply 3 supports a pair of sidewalls 11 arranged externally to the body ply 3, between the tread 7 and the beads 4.

Finally, the body ply 3 supports a pair of abrasion gum strips 12 arranged externally below the sidewalls 13 and at the beads 4.

A transponder 13, that is, an electronic device (normally passive, that is, without an electrical power supply thereof) which is capable of memorizing the information and is capable of communicating by radio frequency, is integrated (immersed) in the interior of the pneumatic tire 1, in particular at a sidewall 11 (for example, the external sidewall 11, that is, the one turned toward the exterior of the vehicle once the pneumatic tire 1 has been mounted on the rim). In other words, the transponder 13 is a "smart label" of small dimensions which is integrated into the interior of the pneumatic tire 1 and is suitable for responding to the remote polling by specific fixed or portable devices, called readers (or else polling devices); a reader is capable of reading and/or modifying the information contained within the transponder 13 that is polling while communicating with the transponder itself 13 in radio frequency. Accordingly, the transponder 13 is a part of a reading and/writing wireless system that operates according to so-called RFID technology ("Radio-Frequency IDentification").

Figure 2:
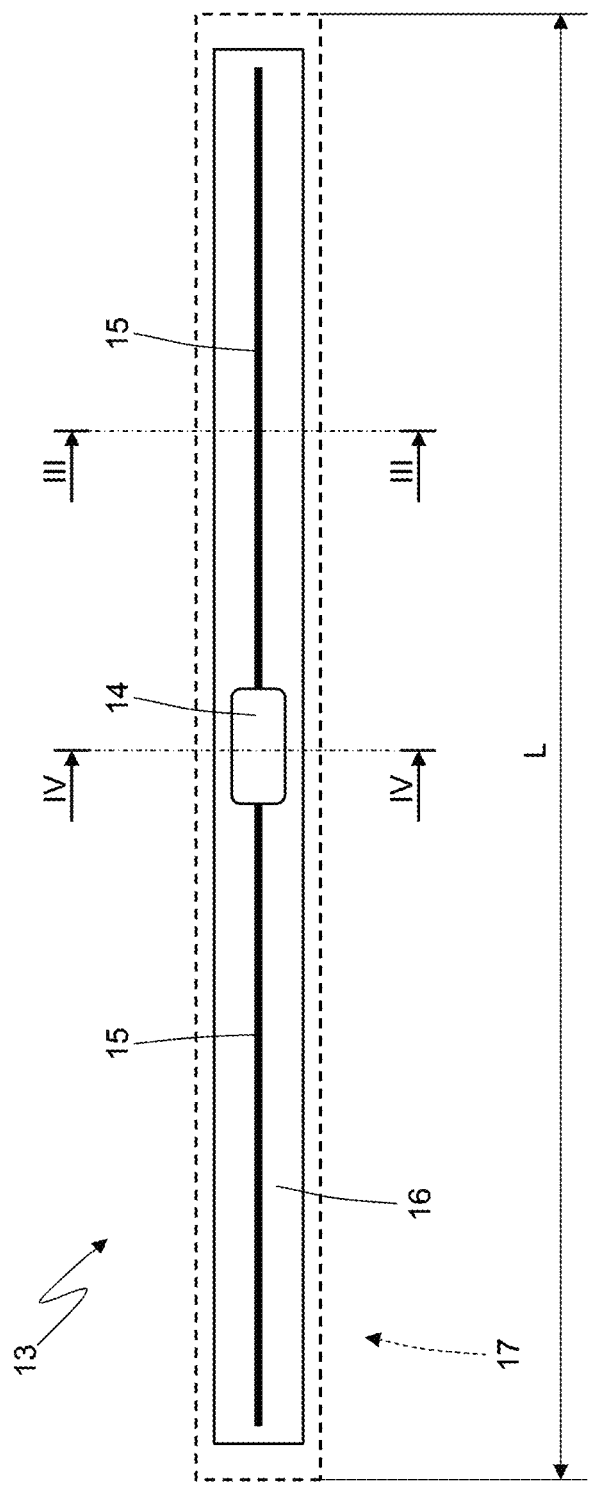
FIG. 2 is a schematic view of a transponder of the pneumatic tire of FIG. 1.

According to what is illustrated in FIG. 2, the transponder 13 comprises an electronic circuit 14 (that is, a microchip) equipped with a non-volatile memory (typically, EEPROM or FRAM, the latter more costly, but technologically more advanced), an antenna 15 connected to the electronic circuit 14, and a support 16, which carries both the electronic circuit 14 and the antenna 15 and is frequently defined as a "substrate" (typically it is made of a thin layer of mylar, plastic like PET or PVC, or other similar materials). In the embodiment illustrated in FIG. 2, the antenna 15 is a dipole antenna (or simply a dipole) and is made of two equal open arms constructed with a linear electrical conductor on which the currents flow that remotely irradiate the electromagnetic field.

In use, the antenna 15 receives an electromagnetic signal that, by electromagnetic induction, induces a difference in electrical potential in the antenna 15, which generates the circulation of an electrical current in the electronic circuit 14 to supply power to the electronic circuit 14 itself; the electronic circuit 14, thus activated, transmits the data contained within the memory thereof by means of the antenna 15 and, where appropriate, also modifies the data contained within the memory thereof.

As illustrated in FIGS. 2 and 3, the transponder 13 is inserted in a sleeve 17, which is made of two strips 18 of green rubber superimposed and pressed one against the other (obviously, the rubber of the two rubber strips 18 is initially raw and is vulcanized together with the rest of the pneumatic tire 1 during the final vulcanization of the pneumatic tire 1 itself); in general, the two strips 18 of green rubber of the sleeve 17 are 1-2 mm longer/wider than the transponder 13 (that is, than the electronic circuit 14 and the antenna 15). The two strips 18 of green rubber are initially parallelepiped and deform around the components of the transponder 13 when they are pressed one against the other around the transponder 13 itself. According to an alternative embodiment, the two strips of rubber 18 of the sleeve 17 are vulcanized from the start (that is, the rubber of the two strips 18 of rubber is vulcanized immediately).

According to another embodiment (not depicted), the support 16 is absent and the function thereof is performed by the strips 18 of rubber of the sleeve 17.

According to a preferred embodiment, the thickness T of the sleeve 17 (containing the transponder 13 within the interior thereof) is overall comprised between 0.6 and 2 mm, the width W of the sleeve 17 is approximately 8-12 mm, and the length L of the sleeve 17 is approximately 60-80 mm.

The transponder 13 is arranged circumferentially, that is, it is arranged along a circumference centered on the axis of rotation of the pneumatic tire; it is important to set forth that the transponder 13 (contained within the sleeve 17) has a parallelepiped rectangular form, and therefore in the interior of the pneumatic tire 1 does not follow the circular progression of all of the other components of the pneumatic tire 1.

Figure 5:
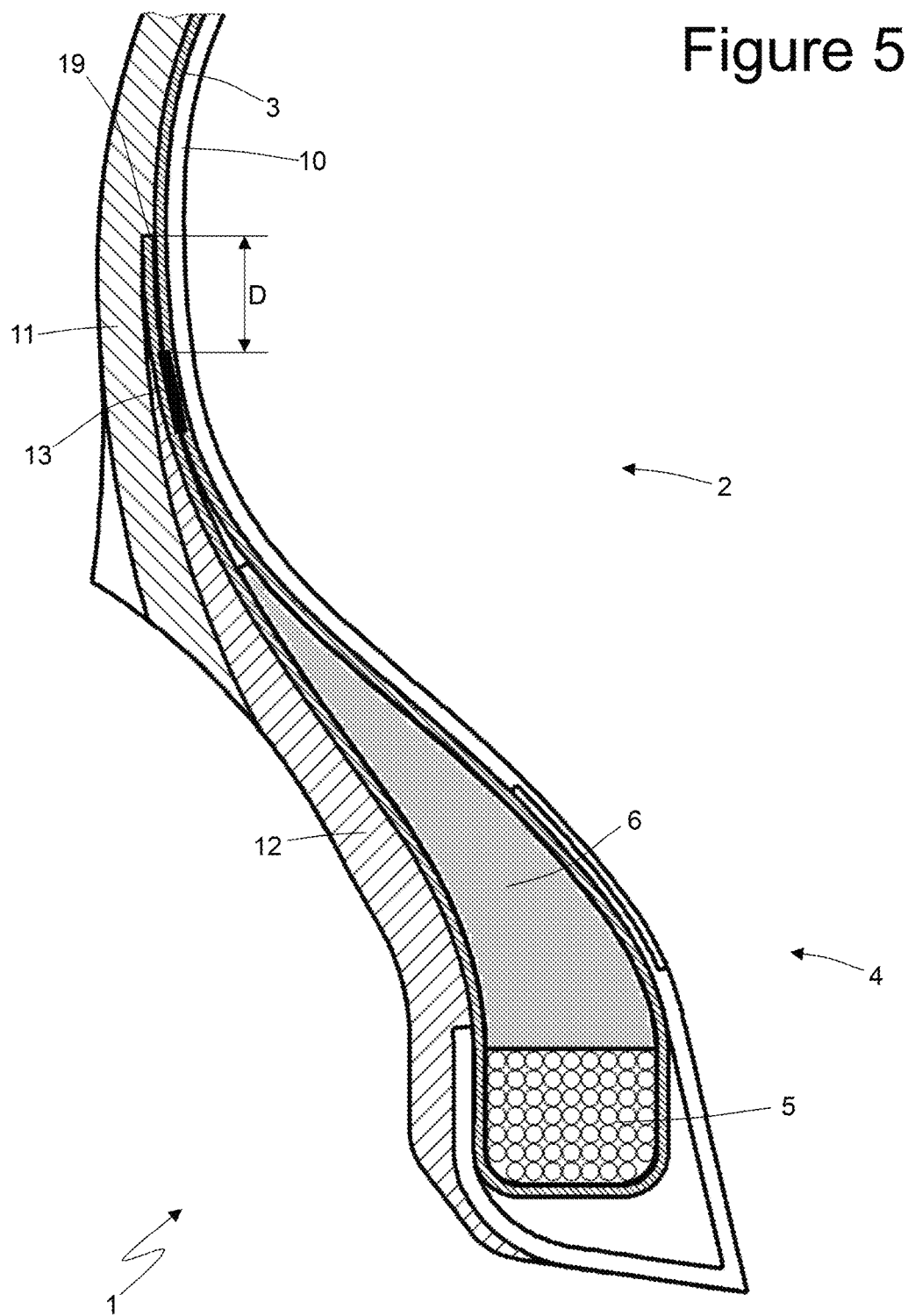
FIGS. 5 and 6 are two enlarged views of a detail of FIG. 1 according to two alternative embodiments.
Figure 6:
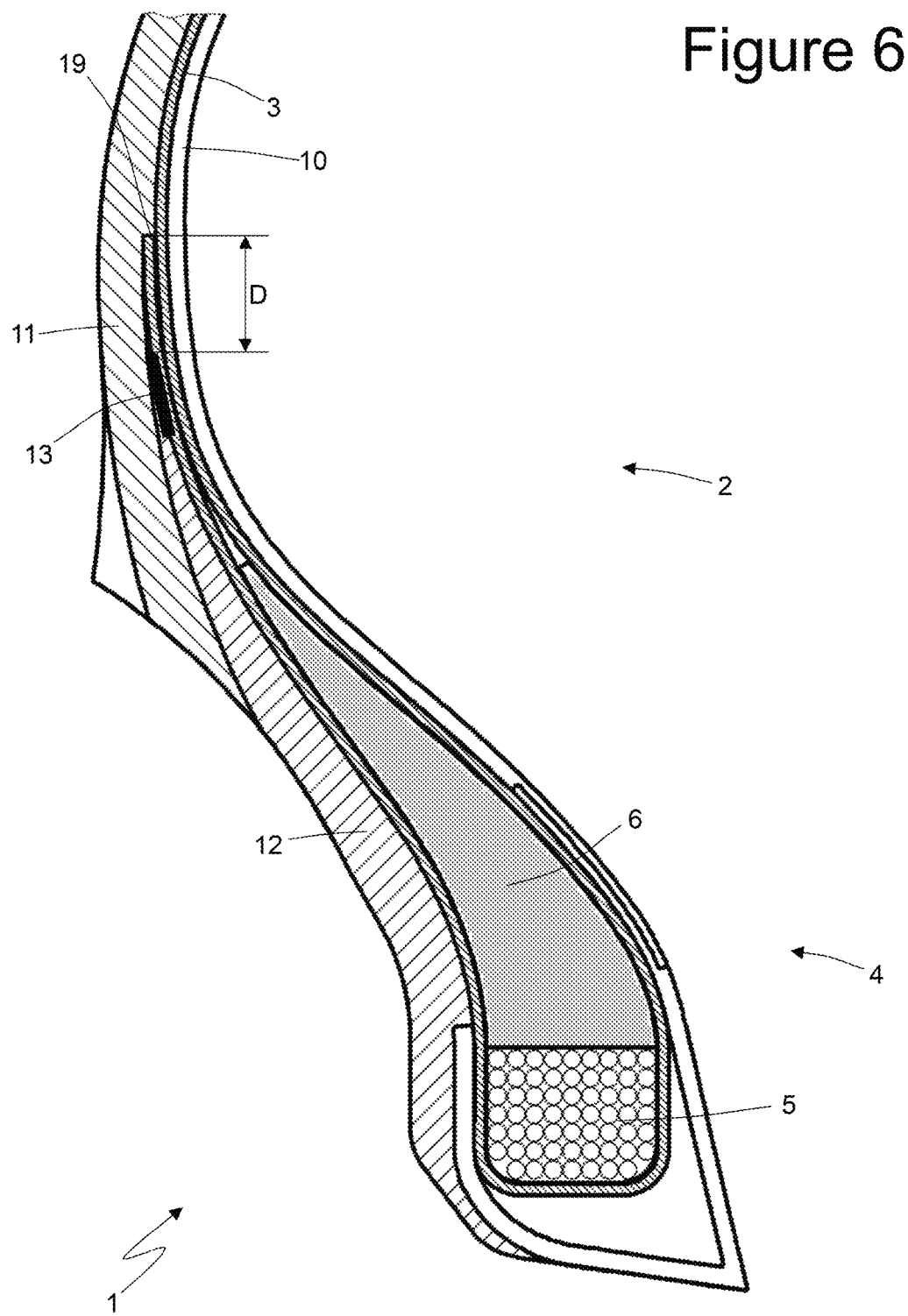

According to the embodiment illustrated in FIGS. 5 and 6, the transponder 13 (contained within the sleeve 17) is arranged in contact with the body ply 3 at a flap of the body ply 3 (that is, of the zone of the body ply 3 collapsed onto itself in a "U" shape and around a bead 4); in each flap of the body ply 3, an edge 19 (that is, a terminal end) of the body ply 3 is leaned against an intermediate portion of the body ply 3 itself. The transponder 13 is arranged radially more to the inside of an edge 19 (that is, a terminal end) of the body ply 3, and then the transponder 13 is located radially between the edge 19 (terminal end) of the body ply 3 and the bead 4. A radial distance D, which is generally equal to 10 mm and in any event greater than 7 mm, is provided between the transponder 13 and the edge 19 (terminal end) of the body ply 3.

The transponder 13 is arranged radially more to the outside of the bead 4 and therefore radially more to the outside of the bead filler 6. Furthermore, the transponder 13 is arranged axially more to the inside of the sidewall 11 and of the abrasion gum strip 12 in proximity to the terminal end of the abrasion gum strip 12 (that is, in a zone wherein both the sidewall 11 and the abrasion gum strip 12 are present).

In the embodiment illustrated in FIG. 5, the transponder 13 (contained within the sleeve 17) is arranged axially to the inside of the flap of the body ply 3, and therefore is laterally (in other words, axially, that is, parallel to the axis of rotation of the pneumatic tire 1) bordering the body ply 3 on both sides; in other words, the transponder 13 is in contact with both sides (in other words, on the right and on the left, that is, both internally and externally) with corresponding portions of the body ply 3.

In the embodiment illustrated in FIG. 6, the transponder 13 (contained within the sleeve 17) is arranged axially to the exterior of the flap of the body ply 3, and therefore is laterally (in other words, axially, that is, parallel to the axis of rotation of the pneumatic tire 1) bordering on one side (internally) with the body ply 3 and on the opposite side (externally) with the abrasion gum strip 12 (as illustrated in FIG. 6) or with the sidewall 11 (according to a non-illustrated variant); in other words, the transponder 13 is in contact internally with a corresponding portion of the body ply 3 and is in contact externally with a corresponding portion of the abrasion gum strip 12 (as illustrated in FIG. 6) or of the sidewall 11 (according to a non-illustrated variant).

Figure 7:
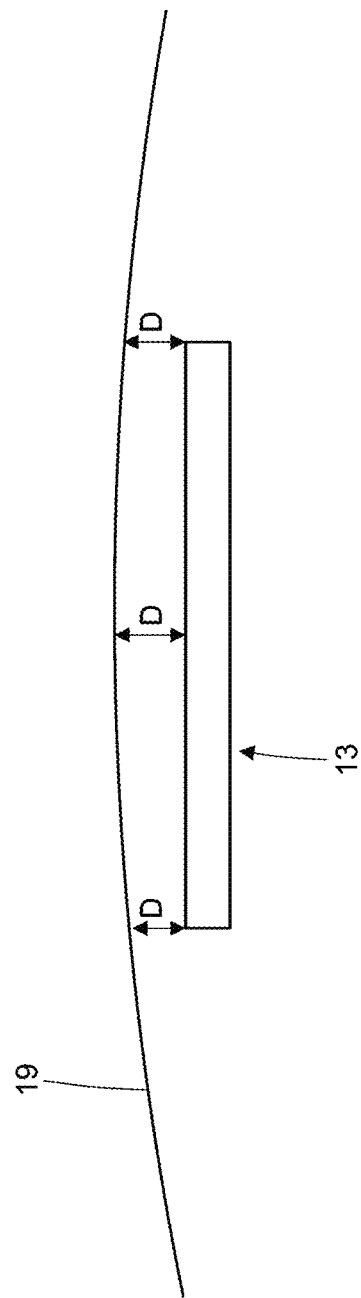
FIG. 7 is a schematic view that shows the arrangement of the transponder of FIG. 2 with respect to an edge of the body ply of the pneumatic tire of FIG. 1.

As mentioned hereinbefore, the transponder 13 is arranged circumferentially and has a parallelepiped rectangular form and in the interior of the pneumatic tire 1 does not follow the circular progression of all the other components of the pneumatic tire 1; as a result, as illustrated in FIG. 7, the radial distance D between the transponder 13 and the edge 19 (terminal end) of the body ply 3 is continuously variable (even if 1-3 mm at the most) along the entire extent of the transponder 13, inasmuch as the transponder 13 has a rectangular progression, while the edge 19 (terminal end) of the body ply 3 has a circular progression. In this respect, it is important to set forth that the minimum (that is, the smallest possible) radial distance D between the transponder 13 and the edge 19 (terminal end) of the body ply 3 is generally equal to 10 mm and in any case is greater than 7 mm; as a result the maximum (that is, the greatest possible) radial distance D between the transponder 13 and the edge 19 (terminal end) of the body ply 3 is (slightly) greater than these values (for example, generally equal to 12 mm and in any case greater than 9 mm).

Figure 8:
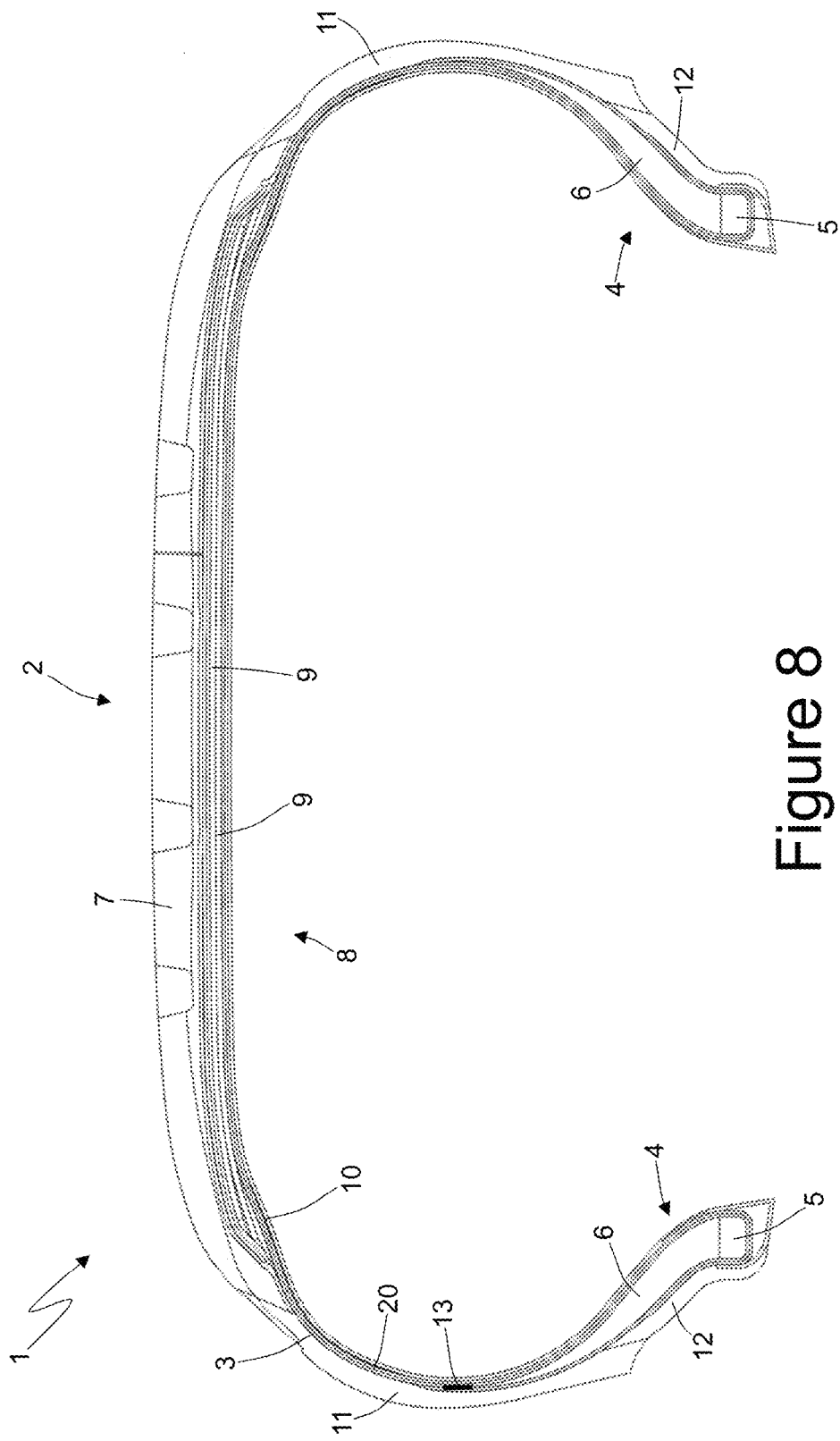
FIG. 8 is a schematic cross section, with parts removed for clarity, of a different embodiment of the pneumatic tire of FIG. 1.

In the embodiment illustrated in FIGS. 1, 5 and 6, the pneumatic tire 1 comprises a single body ply 3, which forms the two flaps around the two beads 4. In the alternative embodiment illustrated in FIGS. 8, 9 and 10, the pneumatic tire 1 comprises the body ply 3 (main), which forms the two flaps around the two beads 4, and a further (secondary or additional) body ply 20, which is smaller than the body ply 3, is superimposed onto the body ply 3, and turns around the two beads 4, but without forming complete flaps like the body ply 3.

It is important to set forth that the body ply 3 (and/or the body ply 20) could be provided with local reinforcing elements, which are applied to limited portions of the body ply 3; for example, the body ply 3 could be provided with a fabric reinforcement, which is applied close to the beads 4, and/or with a calendered "squeegee", which is also applied close to the beads 4. In this case, such reinforcing elements become an integral part of the body ply 3, and, therefore, the transponder 13 can be arranged in contact with the body ply 3 also at such reinforcing elements.

The pneumatic tire 1 can be the "standard" type or else the "non-standard" type; for example, the pneumatic tire 1 could be of the "run-flat" type, of the "sponge" type (that is, provided internally with a spongy body having an acoustic effect), or of the "sealant" type (that is, provided with a sealing agent which is capable of closing any holes).

The embodiments described herein can be combined with each other without departing from the scope of protection of the present disclosure.

The pneumatic tire 1 described above has many advantages.

First and foremost, in the aforementioned pneumatic tire 1 the position of the transponder 13 makes it possible to minimize the stresses and deformations to which the transponder 13 is subjected (both during the construction of the pneumatic tire 1 and during the use of the pneumatic tire 1) and, at the same time, makes it possible to minimize transponder 13 radio frequency communications disturbances and interference (in this way, the transponder 13 can be read at a distance of over 3 meters if the pneumatic tire 1 is not mounted on a metallic rim and at a distance of over 2 meters if the pneumatic tire 1 is mounted on a metallic rim).

Furthermore, in the pneumatic tire 1 described above the presence of the transponder 13 (which is nevertheless a "foreign object" immersed within the pneumatic tire 1) does not have a negative impact upon the performance and the durability (or upon the operating life) of the pneumatic tire 1 itself.

Figure 9:
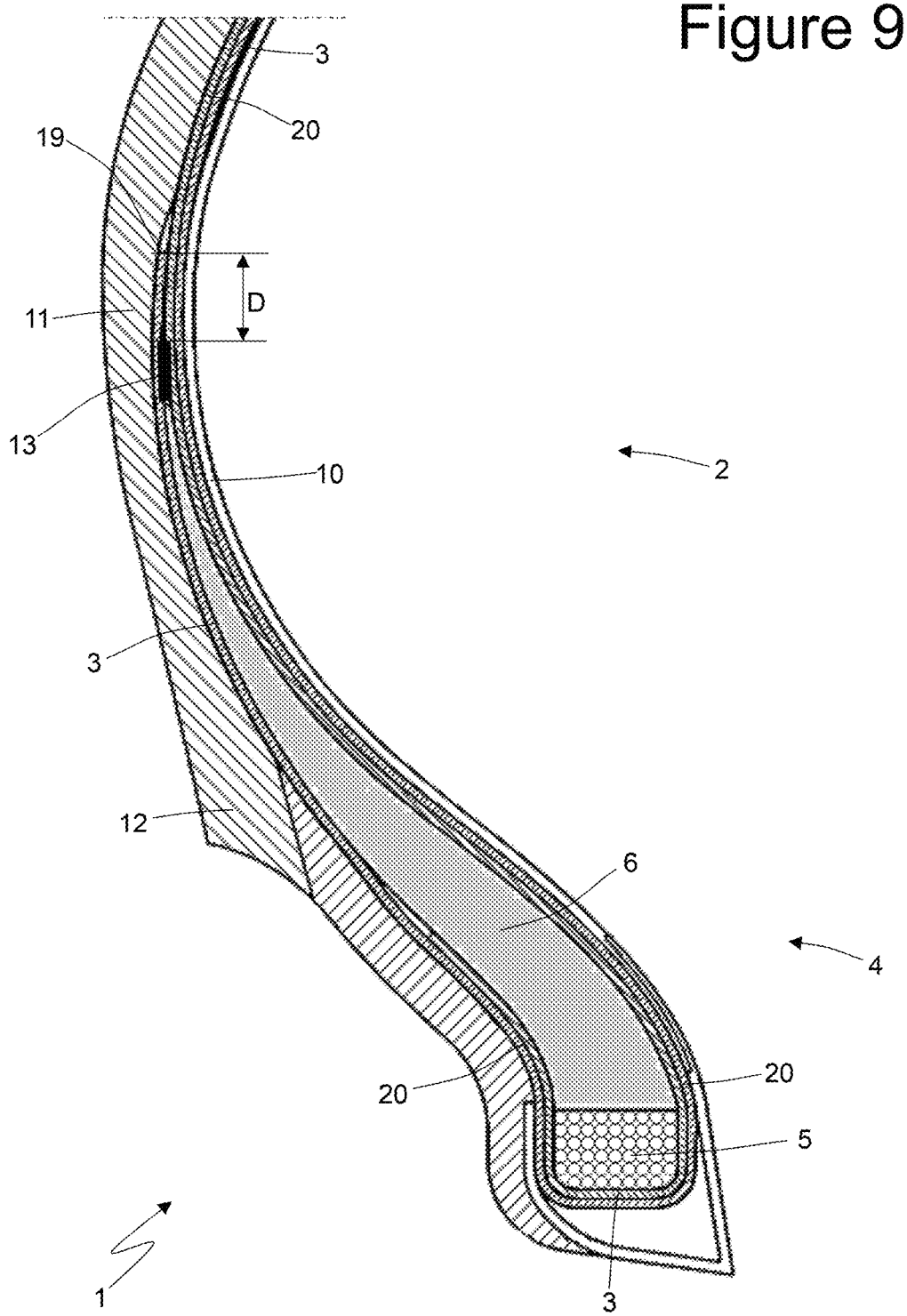
FIGS. 9 and 10 are two enlarged views of a detail of FIG. 8 according to two alternative embodiments.

In the embodiment illustrated in FIGS. 5 and 9, the transponder 13 is better protected from the exterior insofar as it is located more to the inside of a layer of the body ply 3. In the embodiment illustrated in FIGS. 6 and 10, local deformations of the body ply 3 are avoided, and the risk of entrapping air inside the body ply 3 at the transponder 13 is completely avoided, because the space for housing the transponder 13 is completely formed in locally deforming only the sidewall 11 (which is made of a thick layer of rubber and therefore has great deformation capacity).

Figure 10:
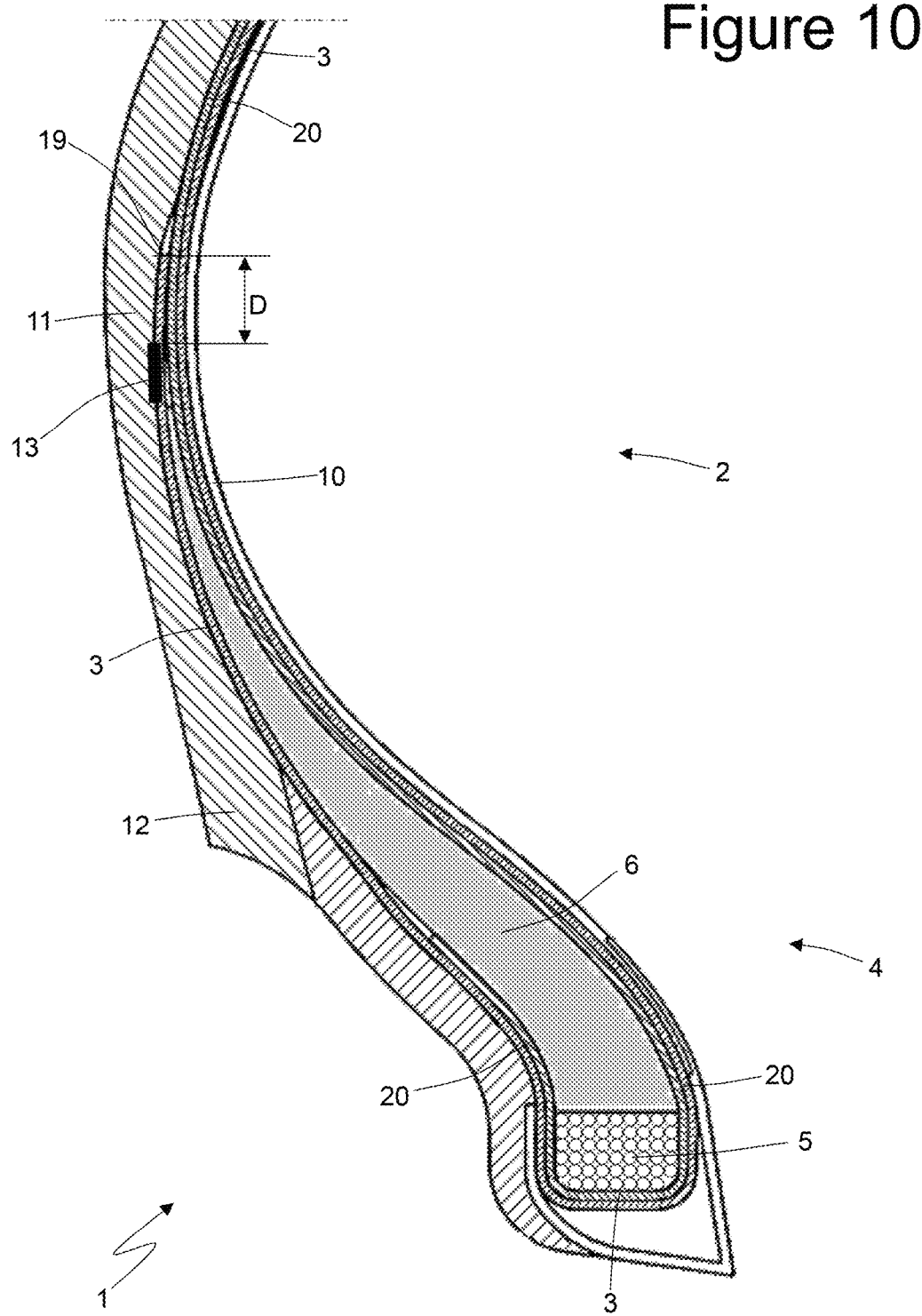

Finally, the construction of the pneumatic tire 1 described above is simple, inasmuch as the transponder 1 can easily be made to adhere to the body ply 3 when the body ply 3 is still completely flat (that is, before wrapping the body ply 3 around the forming drum) or the transponder 1 can easily be made to adhere to a sidewall 11 before mounting the sidewall 11 itself; obviously, the transponder 1 can be made to adhere to a sidewall 11 only in the embodiments illustrated in FIGS. 6 and 10, while the transponder 1 can be made to adhere to the body ply 3 in all of the embodiments.

What is claimed is:

1. A pneumatic tire comprising:
   a toroidal carcass, which comprises a body ply partially collapsed onto itself and therefore having two lateral flaps, in each of which an edge of the body ply rests against an exterior intermediate portion of the body ply itself;
   two annular beads, one on each axial side of the tire, each of which occupies the respective space that is surrounded by the body ply and comprises a bead core and a bead filler;
   an annular tread;
   a pair of sidewalls, one on each axial side of the tire, arranged axially externally to the body ply and extending radially inward from the tread;
   a pair of abrasion gum strips, one on each axial side of the tire, arranged at the beads axially externally to the body ply, and extending radially inward from the sidewalls; and
   a transponder which is axially arranged in an interior of one of the two flaps of the body ply and is located radially more to the inside of the edge of the body ply in the one of the two flaps of the body ply;
   wherein the transponder is arranged in contact with the body ply at the one of the two flaps of the body ply and the transponder is arranged radially between the edge of the body ply in the one of the two flaps of the body ply and the bead surrounded by the part of the body ply including the edge of the body ply;
   wherein a radial distance greater than 7 mm is provided between the transponder and the edge of the body ply in the one of the two flaps of the body ply.

2. The pneumatic tire of claim 1, wherein a radial distance of at least 10 mm at the point of minimum distance is provided between the transponder and the edge of the body ply in the one of the two flaps of the body ply.

3. The pneumatic tire of claim 1, wherein the transponder is arranged radially more to the outside of the bead surrounded by the part of the body ply including the edge of the body ply in the one of the two flaps of the body ply.

4. The pneumatic tire of claim 1, wherein the transponder is axially in contact on both sides with the body ply.

5. The pneumatic tire of claim 1, wherein the transponder is arranged axially more to the inside of the sidewall arranged axially externally to the one of the two flaps of the body ply and of the abrasion gum strip extending radially inward from the sidewall.

6. The pneumatic tire of claim 5, wherein the transponder is arranged in a zone wherein both the sidewall and the abrasion gum strip are present.

7. The pneumatic tire of claim 1, wherein the transponder is inserted within a sleeve made of two strips of rubber superimposed one onto the other.

8. The pneumatic tire of claim 7, wherein the two strips of rubber of the sleeve are 1-2 mm longer and wider than the transponder.

9. The pneumatic tire of claim 7, wherein the two strips of rubber conform to the shape of the components of the transponder.

10. The pneumatic tire of claim 1, wherein the transponder has a rectilinear form whose long sides are in the length direction and whose short sides are in the width direction and wherein the width direction extends outwardly in the tire radial direction.

* * * * *